United States Patent [19]
Smith et al.

[11] Patent Number: 6,068,412
[45] Date of Patent: May 30, 2000

[54] SHUTTER MECHANISM PREVENTS ACCIDENTAL SHUTTER OPENING DUE TO PHYSICAL SHOCK

[75] Inventors: Stephen J. Smith, Shortsville; James D. Boyd, Rochester; Michael Cramer, Victor, all of N.Y.

[73] Assignee: Eastman Kodak Company, Rochester, N.Y.

[21] Appl. No.: 09/283,741

[22] Filed: Apr. 1, 1999

[51] Int. Cl.⁷ ........................................... G03B 9/08
[52] U.S. Cl. ..................... 396/454; 396/453; 396/490; 396/500; 396/503
[58] Field of Search .................................... 396/453, 454, 396/490, 500, 503

[56] References Cited

U.S. PATENT DOCUMENTS

| | | | |
|---|---|---|---|
| 272,117 | 2/1883 | Boydston ................................ | 396/490 |
| 437,290 | 9/1890 | Colgate . | |
| 463,284 | 11/1891 | Burrows . | |
| 501,866 | 7/1893 | Brownell . | |
| 529,369 | 11/1894 | Delug . | |
| 1,024,242 | 4/1912 | Atherton ................................. | 396/490 |
| 2,249,517 | 7/1941 | Crumrine . | |
| 3,081,683 | 3/1963 | Horton et al. . | |
| 3,319,554 | 5/1967 | Bresson et al. . | |
| 3,474,716 | 10/1969 | Wurster . | |
| 3,678,839 | 7/1972 | Michealis . | |
| 4,017,876 | 4/1977 | Coughlan et al. ....................... | 396/450 |
| 4,038,674 | 7/1977 | Whiteside et al. ...................... | 396/450 |
| 4,114,175 | 9/1978 | Huber et al. . | |
| 4,775,872 | 10/1988 | Smart ....................................... | 396/454 |
| 4,962,398 | 10/1990 | Sorg et al. . | |
| 5,255,037 | 10/1993 | Kobayashi . | |
| 5,721,995 | 2/1998 | Katsura et al. . | |

*Primary Examiner*—Russell Adams
*Attorney, Agent, or Firm*—Roger A. Fields

[57] ABSTRACT

A shutter mechanism comprising an aperture through which ambient light is passed to cause a film exposure, a pair of shutter blades supported for pivotal opening movement in opposite opening directions away from one another to uncover the aperture to permit ambient light to pass through the aperture and for pivotal closing movement in return closing directions towards one another to re-cover the aperture and supported to allow them to be pivoted simultaneously in the same direction to cause accidental shutter opening when a physical shock is applied to the shutter blades in the opening direction of one of the shutter blades, is characterized in that each one of the shutter blades completely covers the aperture in order that both of the shutter blades must be removed from the aperture to uncover the aperture to permit ambient light to pass through the aperture, and a single fixed stop is positioned between the shutter blades to prevent either one of the shutter blades from pivoting in the same direction as the other shutter blade to uncover the aperture when one of the shutter blades is pivoted in its opening direction, whereby when one of the shutter blades is pivoted in its opening direction because a physical shock is applied to the shutter blades in that direction the fixed stop prevents the other blade from pivoting in the same direction to cause accidental shutter opening.

9 Claims, 4 Drawing Sheets

SHUTTER MECHANISM PREVENTS ACCIDENTAL SHUTTER OPENING DUE TO PHYSICAL SHOCK

CROSS-REFERENCE TO RELATED APPLICATION

Reference is made to commonly assigned co-pending application Ser. No. 09/283,407 entitled CAMERA WITH BLOCKING DEVICE TO PREVENT ACCIDENTAL SHUTTER OPENING DUE TO MECHANICAL SHOCK SUCH AS WHEN CAMERA JARRED OR DROPPED and filed Apr. 2, 1999 in the names of Anthony DiRisio and Thomas S. Albrecht.

FIELD OF THE INVENTION

The invention relates generally to the field of photography, and in particular to shutter mechanisms for cameras or the like. More specifically, the invention relates to a shutter mechanism that prevents accidental shutter opening due to physical shock such as possibly occurring when a camera is dropped onto a hard surface.

BACKGROUND OF THE INVENTION

As is well known, a shutter mechanism is a device that uncovers and re-covers an aperture to briefly admit the passage of light through the aperture and usually onto unexposed film in a camera.

One type of shutter mechanism that is well known has a pair of shutter blades supported for pivotal opening movement in opposite opening directions away from one another to uncover an aperture to permit ambient light to pass through the aperture and for pivotal closing movement in return closing directions towards one another to re-cover the aperture. See U.S. Pat. Nos. 5,721,995 issued Feb. 24, 1998, No. 5,255,037 issued Oct. 19, 1993, No. 4,114,175 issued Sep. 12, 1978, No. 3,474,716 issued Oct. 28, 1969 and No. 3,319,554 issued May 16, 1967. A complex movement-linking device often interlocks the shutter blades for shutter opening and shutter closing and to prevent them from being pivoted simultaneously in the same direction. If the shutter blades were allowed to be pivoted simultaneously in the same direction, accidental shutter opening might result when a physical shock to the shutter blades is applied to the shutter blades in the same direction as the opening direction of one of the shutter blades. The physical shock possibly occurs when a camera with the shutter mechanism is dropped onto a hard surface.

Problem

In inexpensive cameras, there is a desire to eliminate the movement-linking mechanism to avoid its expense. However, there is still a preference to prevent accidental shutter opening due to a physical shock such as possibly occurring when the camera is dropped onto a hard surface.

The Cross-Referenced Application

The cross-referenced application discloses a camera comprising an aperture through which ambient light is passed to cause a film exposure, a shutter blade pivotable open to uncover the aperture to permit ambient light to pass through the aperture and pivotable closed to re-cover the aperture and susceptible of being moved accidentally due to mechanical shock such as when the camera is dropped or jarred, and a shutter actuator movable to pivot the shutter blade open to uncover the aperture, is characterized in that a blocking device is positioned within a blocking range of the shutter blade to block the shutter blade from being pivoted open to uncover the aperture when the shutter blade is moved accidentally due to mechanical shock, and the shutter blade is supported to be moved out of the blocking range of the blocking device when the shutter actuator is moved to pivot the shutter blade open to uncover the aperture.

SUMMARY OF THE INVENTION

A shutter mechanism comprising an aperture through which ambient light is passed to cause a film exposure, a pair of shutter blades supported for opening movement in opposite opening directions away from one another to uncover the aperture to permit ambient light to pass through the aperture and for closing movement in return closing directions towards one another to re-cover the aperture and supported to allow them to be moved simultaneously in the same direction to cause accidental shutter opening when a physical shock is applied to the shutter blades in the opening direction of one of the shutter blades, is characterized in that:

each one of the shutter blades completely covers the aperture in order that both of the shutter blades must be removed from the aperture to uncover the aperture to permit ambient light to pass through the aperture; and a fixed stop is positioned between the shutter blades to prevent either one of the shutter blades from moving in the same direction as the other shutter blade to uncover the aperture when one of the shutter blades is moved in its opening direction, whereby when one of the shutter blades is moved in its opening direction because a physical shock is applied to the shutter blades in that direction the fixed stop prevents the other blade from moving in the same direction to cause accidental shutter opening.

This is a relatively simple inexpensive design as compared to the known prior art.

DETAILED DESCRIPTION OF THE INVENTION

Figure 1:
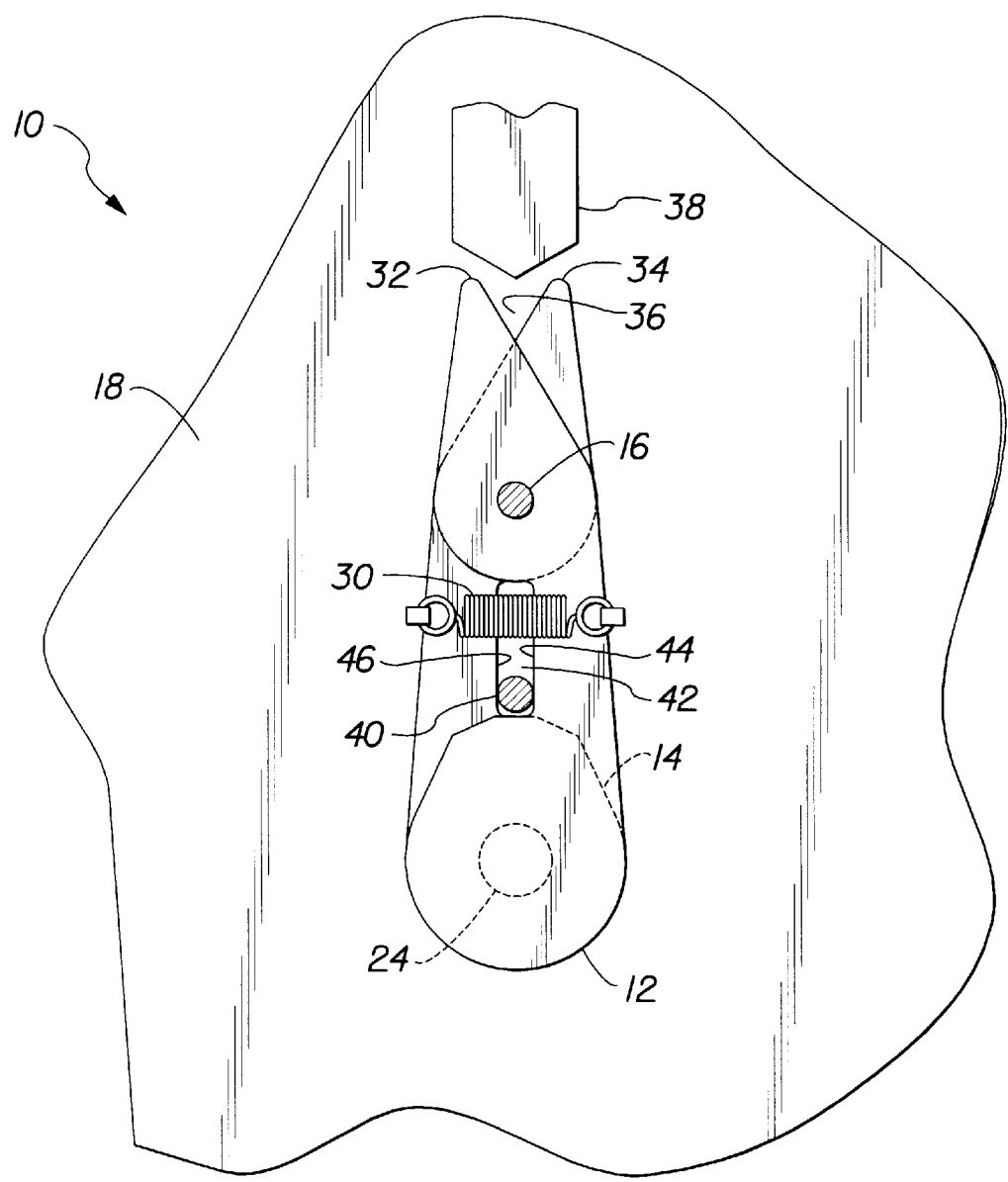
FIG. 1 is an elevation view of a shutter mechanism that prevents accidental shutter opening due to physical shock such as possibly occurring when a camera with the shutter mechanism is dropped onto a hard surface, according to a preferred embodiment of the invention.

The invention is disclosed as being embodied preferably in a camera. Because the features of a camera are generally known, the description which follows is directed in particular only to those elements forming part of or cooperating directly with the disclosed embodiment. It is to be understood, however, that other elements may take various forms known to a person of ordinary skill in the art.

Referring now to the drawings, FIGS. 1–4 depict a shutter mechanism 10 for a camera (not further shown).

Figure 2:
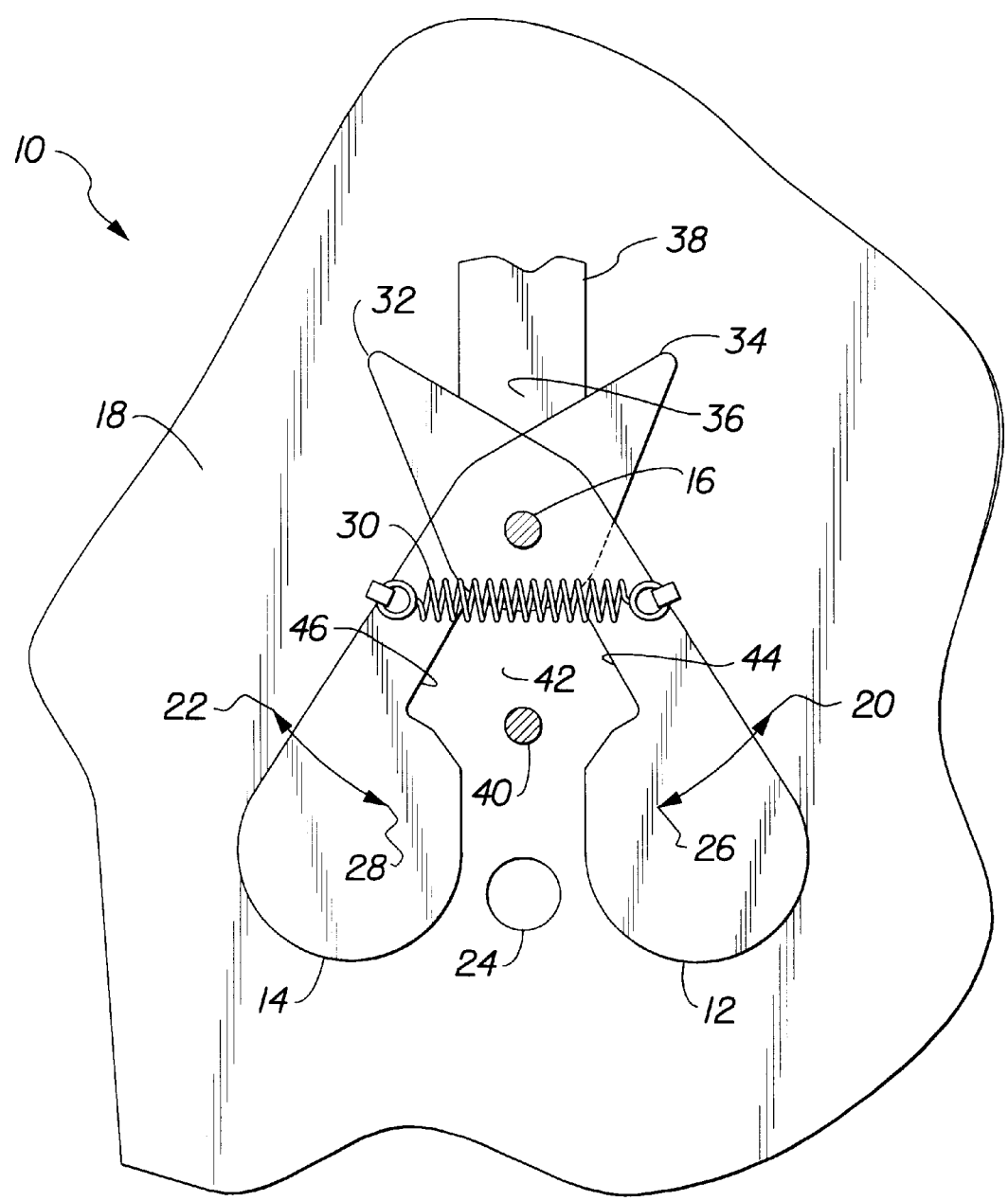
FIG. 2 is an elevation view of the shutter mechanism showing the shutter blades pivoted in opposite opening directions away from one another to uncover an aperture.
Figure 3:
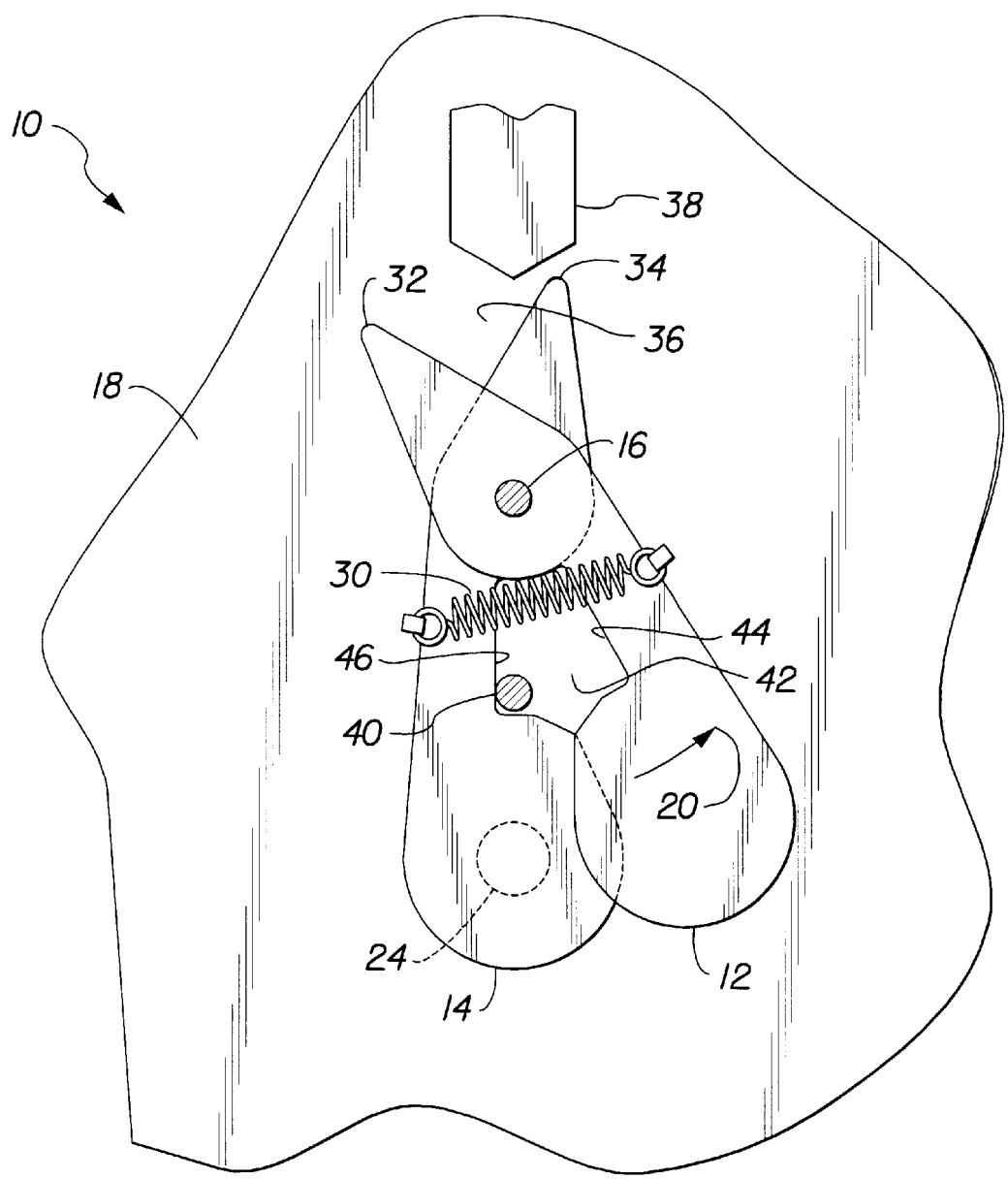
FIG. 3 is an elevation view of the shutter mechanism showing how a single fixed stop prevents accidental shutter opening when a physical shock is applied to the shutter blades in the same direction as the opening direction of one of the shutter blades.
Figure 4:
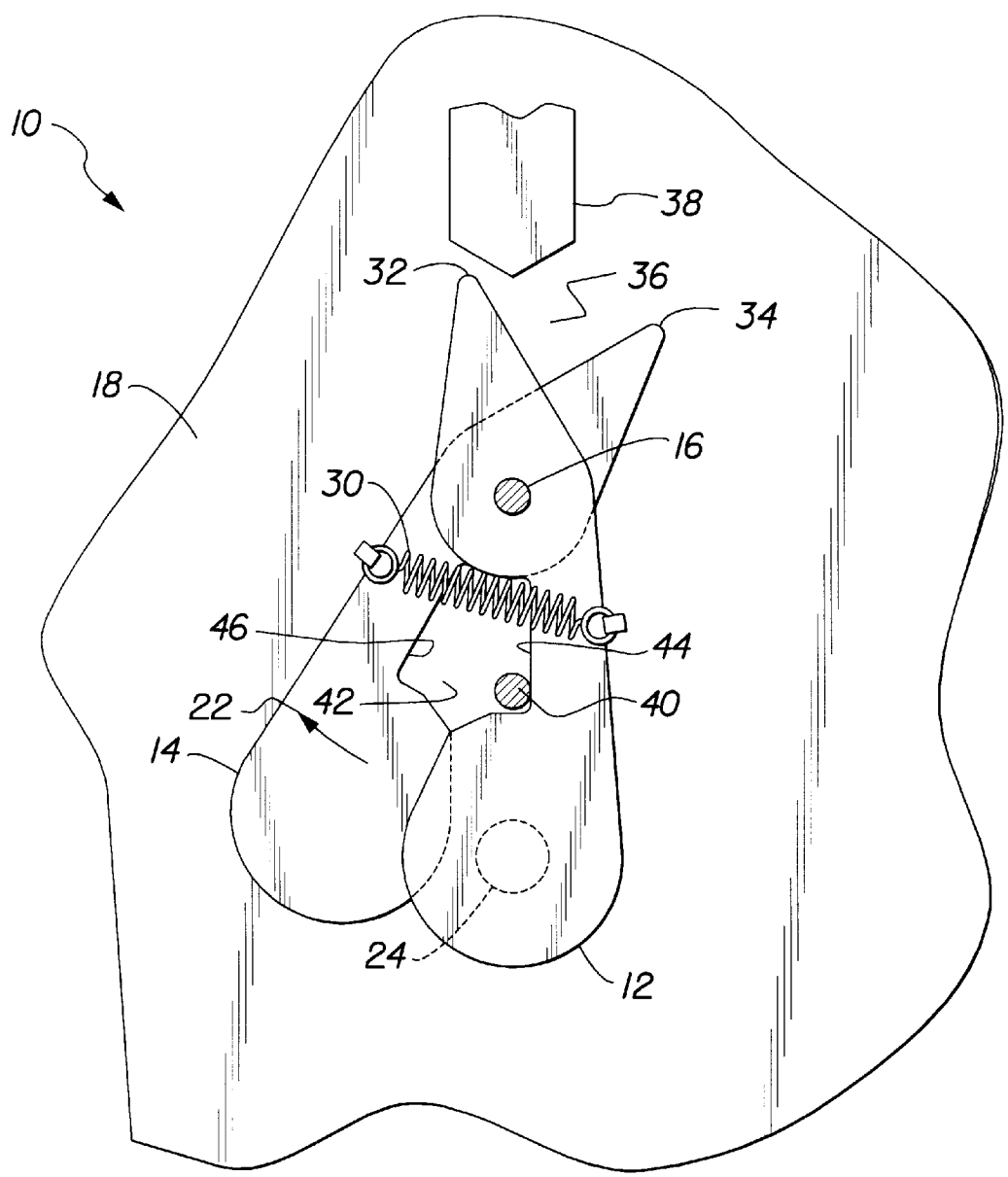
FIG. 4 is an elevation view of the shutter mechanism showing how the single fixed stop prevents accidental shutter opening when the physical shock is applied to the shutter blades in the same direction as the opening direction of the other shutter blade.

A pair of shutter blades 12 and 14 are supported via a single pivot pin 16 on a body portion 18 of the main body part of the camera for pivotal opening movement in opposite opening directions 20 and 22 away from one another to uncover an exposure aperture 24 in the body portion, as shown in FIG. 2, and for pivotal closing movement in return closing directions 26 and 28 towards one another to re-cover the exposure aperture, as shown in FIG. 1. The shutter blades 12 and 14 are supported at a common pivot point, i.e. the pivot pin 16, which is in line with the aperture 24 to permit the shutter blades to be pivoted independently of one another to uncover the aperture.

When the shutter blades 12 and 14 uncover the aperture 24, i.e. are opened, ambient light can pass through the aperture to expose film in the camera. When the shutter blades 12 and 14 re-cover the aperture 24, i.e. are closed, they substantially overlap to each completely cover the aperture. Thus, both of the shutter blades 12 and 14 must be removed from the aperture 24 to permit ambient light to pass through the aperture.

A helical tension return spring 30 interconnects the shutter blades 12 and 14 to continuously urge them in their closing directions 26 and 28 towards one another to close the shutter blades. See FIGS. 1 and 2.

The shutter blades 12 and 14 have respective end portions 32 and 34 that extend from the pivot pin 16 to define a space 36 between them. A known actuator 38 such as a high energy lever is movable into the space 36, as shown in FIG. 2, to pivot the shutter blades 12 and 14 in the opening directions 20 and 22 away from one another to open the shutter blades and uncover the aperture 24.

A single fixed stop 40 on the body portion 18 is positioned in line with the pivot pin 16 and the aperture 24, mid-way between the pivot pin and the aperture as shown in FIGS. 1 and 2, and within a space 42 which is defined by equally relieved portions 44 and 46 of the shutter blades 12 and 14 when the shutter blades are closed as shown In FIG. 1. The fixed stop 40 prevents either one of the shutter blades 12 and 14 from pivoting in the same direction as the other shutter blade to uncover the aperture 24 when one of the shutter blades is pivoted in its opening direction 20 in FIG. 3 and 22 in FIG. 4. The fixed stop 40 allows the shutter blades 12 and 14 to uncover the aperture 24 to permit ambient light to pass through the aperture only when they are pivoted in the opening directions 20 and 22 away from one another. Thus, when one of the shutter blades 12 or 14 is moved in its opening direction 20 in FIG. 3 or 22 in FIG. 4 because a physical shock is applied to the shutter blades in that direction the fixed stop 40 prevents the other blade from moving in the same direction to cause accidental shutter opening.

The invention has been described with reference to a preferred embodiment. However, it will be appreciated that variations and modifications can be effected by a person of ordinary skill in the art without departing from the scope of the invention.

PARTS LIST 10. shutter mechanism
12. shutter blade
14. shutter blade
16. pivot pin
18. body portion
20. opening direction
22. opening direction
24. aperture
26. closing direction
28. closing direction
30. return spring
32. end portion
34. end portion
36. space
38. actuator
40. fixed stop
42. space
44. relieved portion
46. relieved portion

What is claimed is:

1. A shutter mechanism comprising an aperture through which ambient light is passed to cause a film exposure, a pair of shutter blades supported for opening movement in opposite opening directions away from one another to uncover said aperture to permit ambient light to pass through the aperture and for closing movement in return closing directions towards one another to re-cover said aperture and supported to allow them to be moved simultaneously in the same direction to cause accidental shutter opening when a physical shock is applied to said shutter blades in said opening direction of one of the shutter blades, is characterized in that:

each one of said shutter blades completely covers said aperture in order that both of the shutter blades must be removed from the aperture to uncover the aperture to permit ambient light to pass through the aperture; and a fixed stop is positioned between said shutter blades to prevent either one of the shutter blades from moving in the same direction as the other shutter blade to uncover said aperture when one of the shutter blades is moved in its opening direction, whereby when one of said shutter blades is moved in its opening direction because a physical shock is applied to the shutter blades in that direction said fixed stop prevents the other blade from moving in the same direction to cause accidental shutter opening.

2. A shutter mechanism as recited in claim 1, wherein said shutter blades are supported at a common pivot point which is in line with said aperture to permit said shutter blades to be pivoted independently of one another to uncover the aperture to pass ambient light through the aperture.

3. A shutter mechanism as recited in claim 2, wherein said fixed stop is positioned in line with said aperture and said common pivot point.

4. A shutter mechanism as recited in claim 3, wherein said fixed stop is positioned between said aperture and said common pivot point.

5. A shutter mechanism as recited in claim 2, wherein said shutter blades have respective end portions that extend from said common pivot point to define a space between them, and an actuator is movable into said space between said end portions to pivot them away from one another in said opening directions of said shutter blades.

6. A shutter mechanism as recited in claim 1, wherein said shutter blades have equally relieved portions that define a space between them, and said fixed stop is positioned in said space.

7. A shutter mechanism as recited in claim 1, wherein said fixed stop is a single pin positioned between said shutter blades.

8. A shutter mechanism comprising an aperture through which ambient light is passed to cause a film exposure, a pair of shutter blades supported for pivotal opening movement in opposite opening directions away from one another to uncover said aperture to permit ambient light to pass through the aperture and for pivotal closing movement in return closing directions towards one another to re-cover said aperture, is characterized in that:

each one of said shutter blades completely covers said aperture in order that both of the shutter blades must be pivoted from the aperture to uncover the aperture to permit ambient light to pass through the aperture; and a fixed stop is positioned in a space between said shutter blades to prevent either one of the shutter blades from pivoting in the same direction as the other shutter blade when one of the shutter blades is pivoted in its opening direction, whereby said shutter blades can uncover said aperture to permit ambient light to pass through the aperture only when they are pivoted in said opening directions away from one another.

9. A shutter mechanism as recited in claim 8, wherein a return spring interconnects said shutter blades to urge them in their closing directions.

* * * * *